United States Patent
Hirose

(10) Patent No.: US 7,765,193 B2
(45) Date of Patent: Jul. 27, 2010

(54) CONTROL OF DOCUMENT DISCLOSURE ACCORDING TO AFFILIATION OR DOCUMENT TYPE

(75) Inventor: Masako Hirose, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 839 days.

(21) Appl. No.: 11/073,755

(22) Filed: Mar. 8, 2005

(65) Prior Publication Data

US 2005/0203916 A1 Sep. 15, 2005

(30) Foreign Application Priority Data

Mar. 15, 2004 (JP) ............................. 2004-072665

(51) Int. Cl.
*G06F 17/00* (2006.01)
(52) U.S. Cl. ................................ 707/694; 707/999.205; 715/260; 715/971
(58) Field of Classification Search ................. 707/608, 707/609, 694, 727, 728, 999.205; 715/224, 715/225, 254, 255, 260, 971
See application file for complete search history.

(56) References Cited

U.S. PATENT DOCUMENTS

| | | | | |
|---|---|---|---|---|
| 7,120,625 | B2 * | 10/2006 | Kagimasa et al. | 707/3 |
| 7,120,861 | B1 * | 10/2006 | Marukawa | 715/501.1 |
| 2003/0093417 | A1 * | 5/2003 | Kagimasa et al. | 707/3 |
| 2003/0126001 | A1 * | 7/2003 | Northcutt et al. | 705/8 |
| 2003/0233441 | A1 * | 12/2003 | Nishiyama et al. | 709/223 |
| 2005/0235020 | A1 * | 10/2005 | Gabelmann et al. | 707/205 |

FOREIGN PATENT DOCUMENTS

| | | |
|---|---|---|
| JP | 03-125264 | 5/1991 |
| JP | 03-286371 | 12/1991 |
| JP | 03-286372 | 12/1991 |
| JP | 04-096176 | 3/1992 |
| JP | 11-143871 | 5/1999 |
| JP | 2000-353162 | 12/2000 |
| JP | 2001-142893 | 5/2001 |
| JP | 2002-259363 | 9/2002 |
| JP | 2002-259368 | 9/2002 |
| JP | 2002-312362 | 10/2002 |
| JP | 2004-234597 | 8/2004 |

* cited by examiner

*Primary Examiner*—Fred I Ehichioya
(74) *Attorney, Agent, or Firm*—Dickstein Shapiro LLP

(57) ABSTRACT

An apparatus for supplying document includes a storage unit configured to store therein a set of documents and an affiliation within an organization paired up with one of the documents, a unit configured to receive a request for accessing the one of the documents, a unit configured to check an affiliation of a person who made the request, a unit configured to evaluate a relationship between the checked affiliation and the stored affiliation paired up with the one of the documents in a tree structure representing a hierarchical structure of the organization with nodes of the tree structure representing affiliations within the organization, a unit configured to ascertain a level of disclosure with respect to the one of the documents in response to the evaluated relationship, and a unit configured to control disclosing of the one of the documents according to the ascertained level of disclosure.

13 Claims, 11 Drawing Sheets

| DISTANCE | PROCESS |
|---|---|
| AFFILIATION IDENTICAL OR SUBORDINATE TO ANOTHER | DISCLOSING |
| AFFILIATIONS DIFFER ONLY AT LOWEST LEVEL | MASKING |
| OTHERWISE | NOT DISCLOSING |

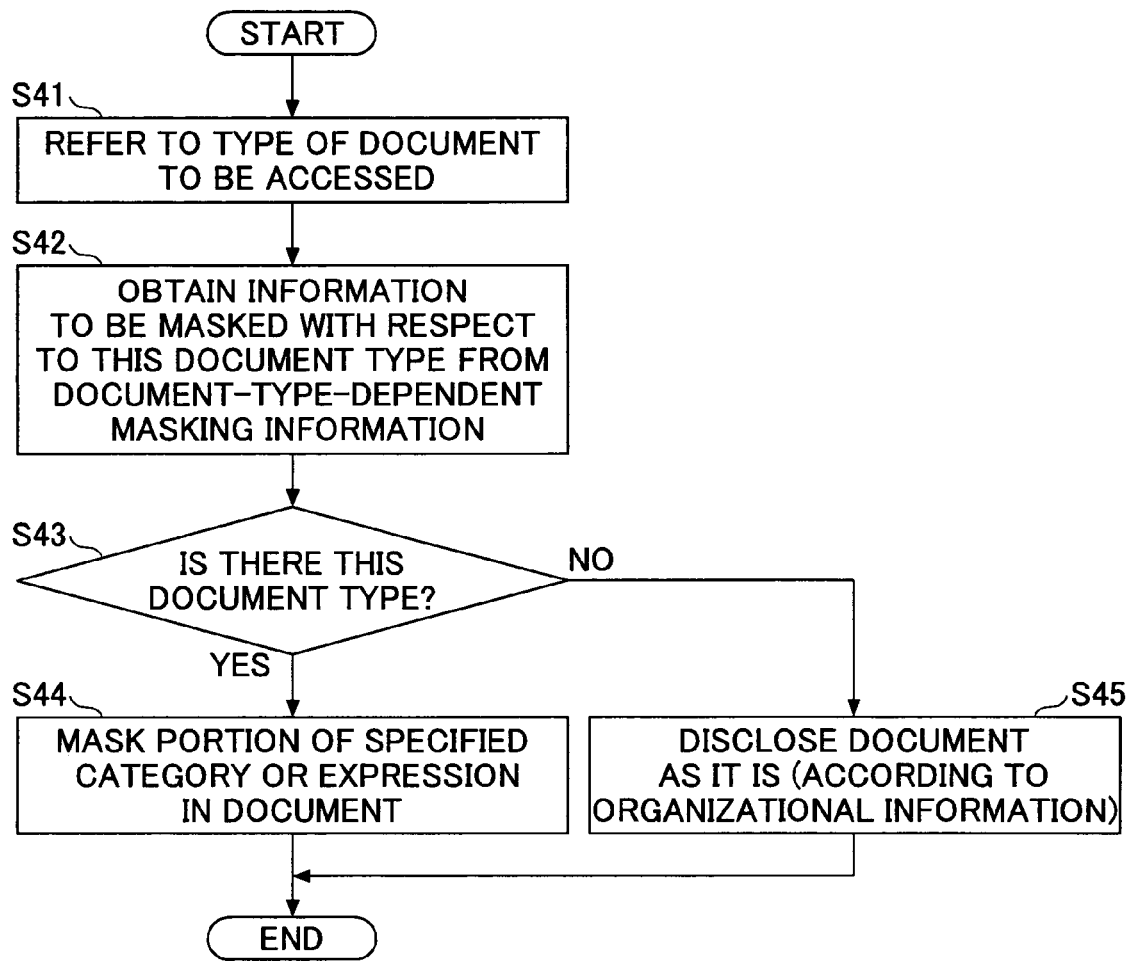

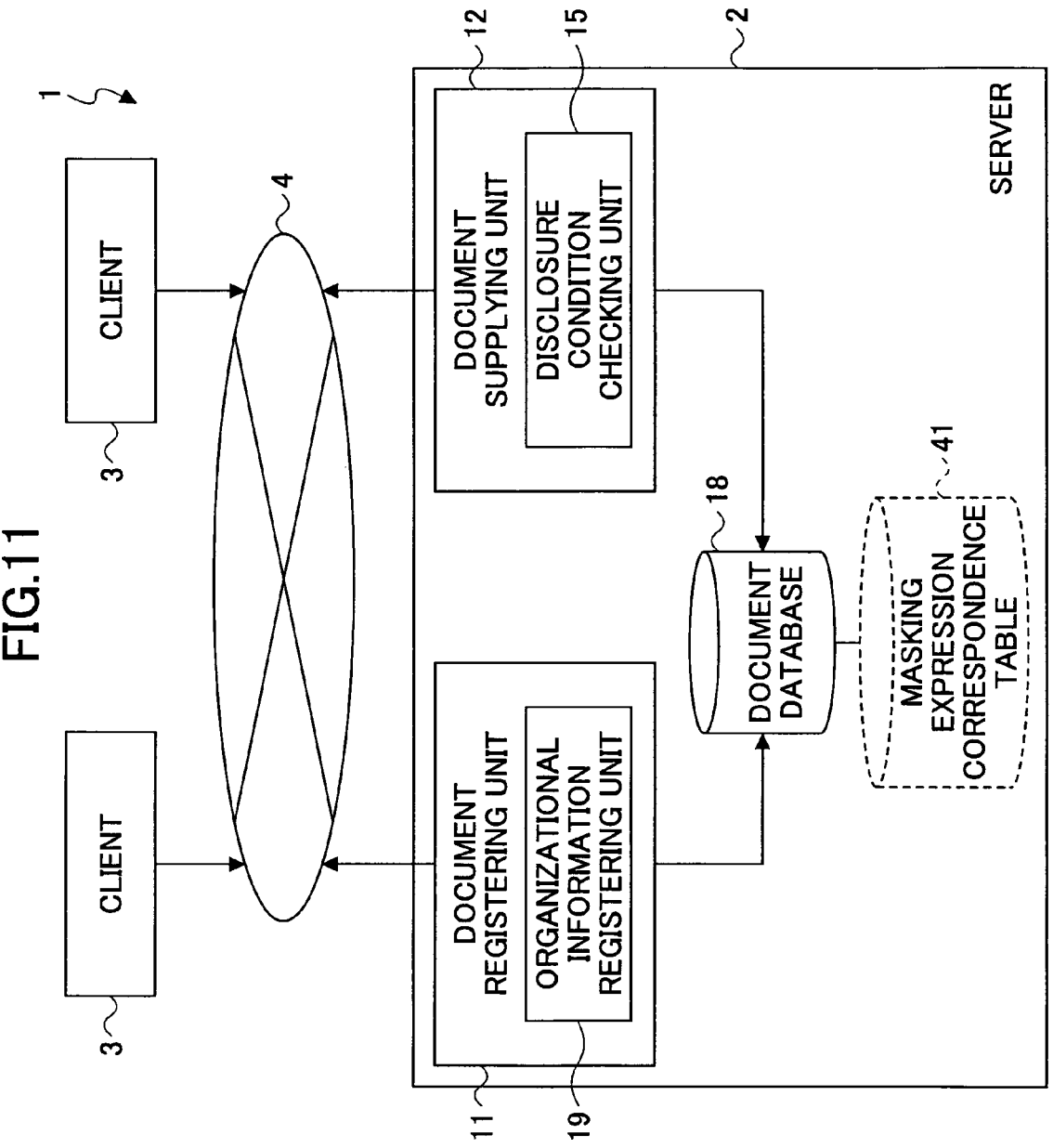

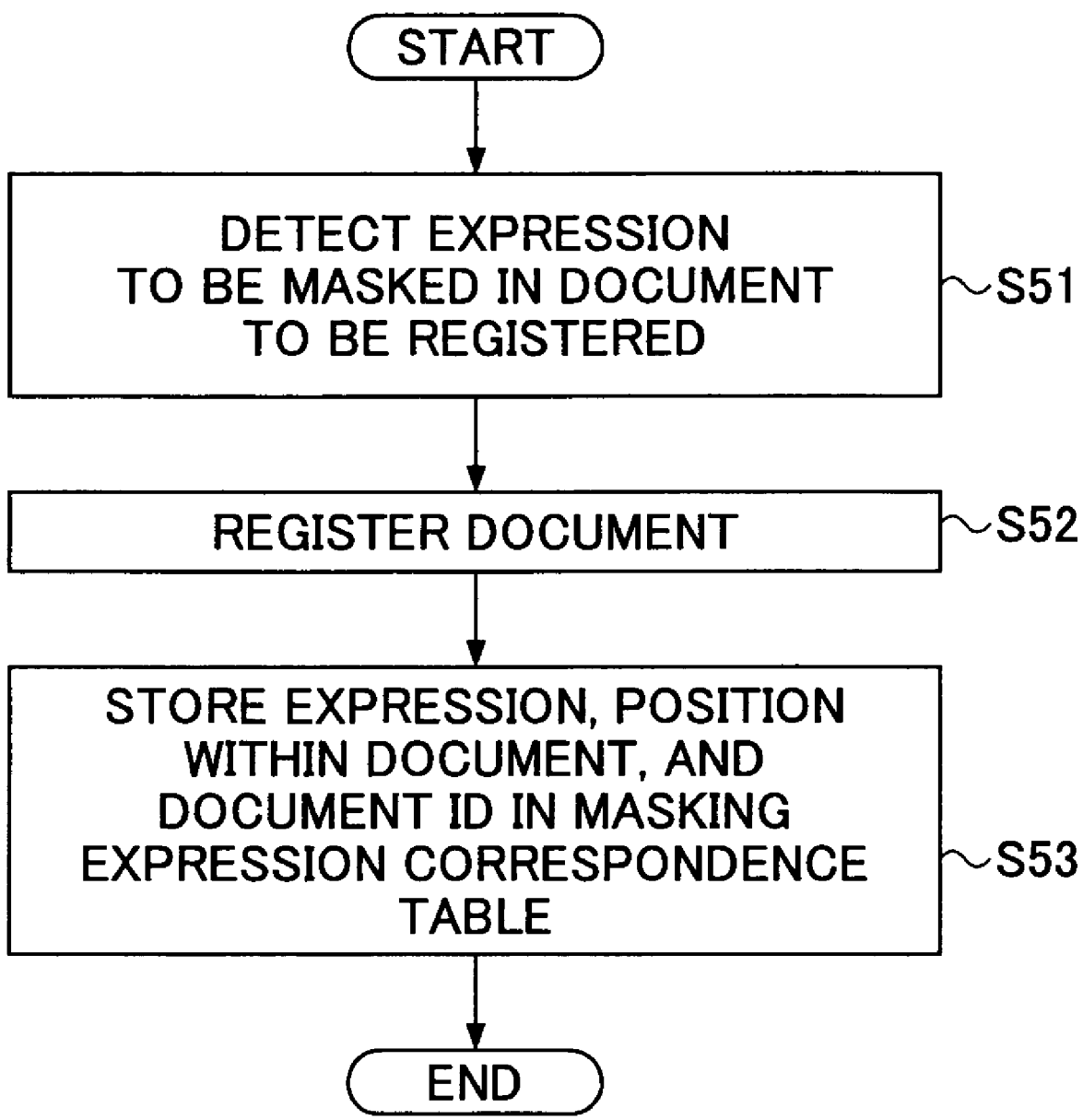

| DOCUMENT ID | POSITION WITHIN DOCUMENT | ORIGINAL EXPRESSION |
|---|---|---|
| 1 | 119 | ABC MANUFACTURING |
| 1 | 129 | 1,000,000 YEN |

CONTROL OF DOCUMENT DISCLOSURE ACCORDING TO AFFILIATION OR DOCUMENT TYPE

BACKGROUND OF THE INVENTION

1. Field of the Invention

The present invention generally relates to a document supplying apparatus for supplying a document retrieved from a set of documents in response to a request, a document supplying system having such document supplying apparatus implemented therein, a program for causing a computer to perform the function of the document supplying apparatus, and a machine-readable storage medium having such a program embodied therein.

2. Description of the Related Art

Patent Documents 1 through 5 disclose examples of technologies for performing the automatic masking of letters or the like.

[Patent Document 1] Japanese Patent Application Publication No. 2001-142893
[Patent Document 2] Japanese Patent Application Publication No. 2002-259363
[Patent Document 3] Japanese Patent Application Publication No. 2002-2593.68
[Patent Document 4] Japanese Patent Application Publication No. 11-143871
[Patent Document 5] Japanese Patent Application Publication No. 2002-312362.

Information that can be used to identify individuals or organizations, such as the names, telephone numbers, mail addresses, or the like of individuals or organizations, needs to be handled with sufficient care since such information relates to privacy. In recent years, particularly, there has been a trend in which the sharing of information inside/outside organizations is advanced to improve the efficiency of business. This creates an environment in which information is easy to be distributed to third parties through the sharing of information.

There is an increasing awareness that privacy and confidential information need to be protected. Because of this, the sharing of documents including such information is aborted in some cases. This may serve as a factor that hampers the trend toward the sharing of information.

If the sharing of information is to be advanced, there may be a need to manually erase or mask sensitive portions that relate to privacy and confidential information. This increases costs, and may present a situation in which error by oversight occurs.

A technology for processing documents as image information is known as a means to counter such shortcomings. A means to mask sensitive portions in an image is sometimes provided in a scanner, a copier, etc., but requires a manual input for identifying the area to be masked. The trouble of manual labor still remains.

A technology for processing sensitive portions as a unit of information, rather than as an image, is also known. For example, there is a technology for masking particular fields in table format data (e.g., Kanjou Bugyou Series by OBIC (registered trademark)), and also a technology for allowing an area to be specified at the time of document creation (e.g., Ichitaro by JUSTSYSTEM (registered trademark)). The use of such table format information, however, has a shortcoming in that other types of formats cannot be used.

The technologies disclosed in Patent Documents 1 through 3 are directed to the automatic masking of letters or the like. These technologies of Patent Documents 1 through 3 automatically extract proper nouns from information by applying morphological analysis or the like, and process the extracted portions through the masking of letters or the like. In this case, no data about the users to whom the information is supplied is given, so that the masking of letters is carried out indiscriminately with respect to all the users. The creator of the document and trusted parties should be treated differently from third parties in terms of whether to mask the information. Despite this, these technologies described here cannot provide such discriminatory treatment of parties.

Patent Document 4 discloses a technology for applying blurring to a registered document based on profile information that is carried by a party who is accessing the document. This technology can control the range of information disclosure according to the conditions of a party who is requesting the information. However, the party who is accessing the information needs to bear the trouble of carrying a profile. Further, no consideration is given to differences between the creator of the document, the person having registered the document, and third parties.

The technology disclosed in Patent Document 5, on the other hand, determines whether to mask information by using information about the organization to which a person having registered the document belongs and by comparing this information with information about the organization to which the creator of the document belongs. This technology utilizes information about organizations when determining whether to mask information. There is a need, however, to provide descriptions of all the members in advance belonging to the organizations to which information can be presented. This is cumbersome.

Further, this technology defines expressions to be masked solely based on organizational information. This ends up treating all documents in the same manner, giving no consideration to the types of documents.

Accordingly, there is a need for a mechanism for easily controlling document disclosure levels according to a person who is requesting access.

There is another need for a mechanism for easily controlling document disclosure levels according to the types of documents.

SUMMARY OF THE INVENTION

It is a general object of the present invention to provide a mechanism for easily controlling document disclosure levels that substantially obviates one or more problems caused by the limitations and disadvantages of the related art.

Features and advantages of the present invention will be presented in the description which follows, and in part will become apparent from the description and the accompanying drawings, or may be learned by practice of the invention according to the teachings provided in the description. Objects as well as other features and advantages of the present invention will be realized and attained by a mechanism for easily controlling document disclosure levels particularly pointed out in the specification in such full, clear, concise, and exact terms as to enable a person having ordinary skill in the art to practice the invention.

To achieve these and other advantages in accordance with the purpose of the invention, the invention provides an apparatus for supplying document, which includes a storage unit configured to store therein a set of documents and an affiliation (position) within an organization paired up with one of the documents, a unit configured to receive a request for accessing the one of the documents, a unit configured to check an affiliation of a person who made the request, a unit configured to evaluate a relationship between the checked affiliation and the stored affiliation paired up with the one of the documents in a tree structure representing a hierarchical structure of the organization with nodes of the tree structure representing affiliations within the organization, a unit configured to ascertain a level of disclosure with respect to the one of the documents in response to the evaluated relationship, and a unit configured to control disclosing of the one of the documents according to the ascertained level of disclosure.

According to another aspect of the present invention, a machine-readable storage medium having a program embodied therein for causing a computer to supply a document is provided. The program includes a program-code unit configured to store a set of documents and an affiliation within an organization paired up with one of the documents, a program-code unit configured to receive a request for accessing the one of the documents, a program-code unit configured to check an affiliation of a person who made the request, a program-code unit configured to evaluate a relationship between the checked affiliation and the stored affiliation paired up with the one of the documents in a tree structure representing a hierarchical structure of the organization with nodes of the tree structure representing affiliations within the organization, a program-code unit configured to ascertain a level of disclosure with respect to the one of the documents in response to the evaluated relationship, and a program-code unit configured to control disclosing of the one of the documents according to the ascertained level of disclosure.

According to another aspect of the present invention, an apparatus for supplying a document includes a unit configured to receive a request for accessing a document among a set of documents, an identifying unit configured to identify a document type of the requested document, a level indicating unit configured to indicate a predefined level of disclosure/nondisclosure separately for each document type, and a unit configured to control disclosing of the requested document according to the predefined level of disclosure/nondisclosure corresponding to the identified document type in response to the request.

According to another aspect of the present invention, a machine-readable storage medium having a program embodied therein for causing a computer to supply a document is provided. The program includes a program-code unit configured to receive a request for accessing a document among a set of documents, a program-code unit configured to identify a document type of the requested document, a program-code unit configured to indicate a predefined level of disclosure/nondisclosure separately for each document type, and a program-code unit configured to control disclosing of the requested document according to the predefined level of disclosure/nondisclosure corresponding to the identified document type in response to the request.

According to at least one embodiment of the present invention, a decision as to the degree of disclosure for disclosing a document to a person requesting access is made based on the affiliation within an organization of the person requesting access. There is thus no need for the trouble of assigning document disclosure levels to all the members of the organization, thereby providing a system that is easy to use.

According to at least one embodiment of the present invention, further, the level of document disclosure can be easily controlled according to the types of documents.

BRIEF DESCRIPTION OF THE DRAWINGS

Other objects and further features of the present invention will be apparent from the following detailed description when read in conjunction with the accompanying drawings, in which:

FIG. 9 is a flowchart showing a procedure performed by the disclosure condition checking unit and a masking unit;

FIG. 10 is a drawing for explaining an example of document-type-dependent masking information;

FIG. 11 is a functional block diagram of the document supplying system according to another embodiment of the present invention;

FIG. 12 is a flowchart of a process performed by a document registering unit;

DESCRIPTION OF THE PREFERRED EMBODIMENTS

In the following, embodiments of the present invention will be described with reference to the accompanying drawings.

Figure 1:
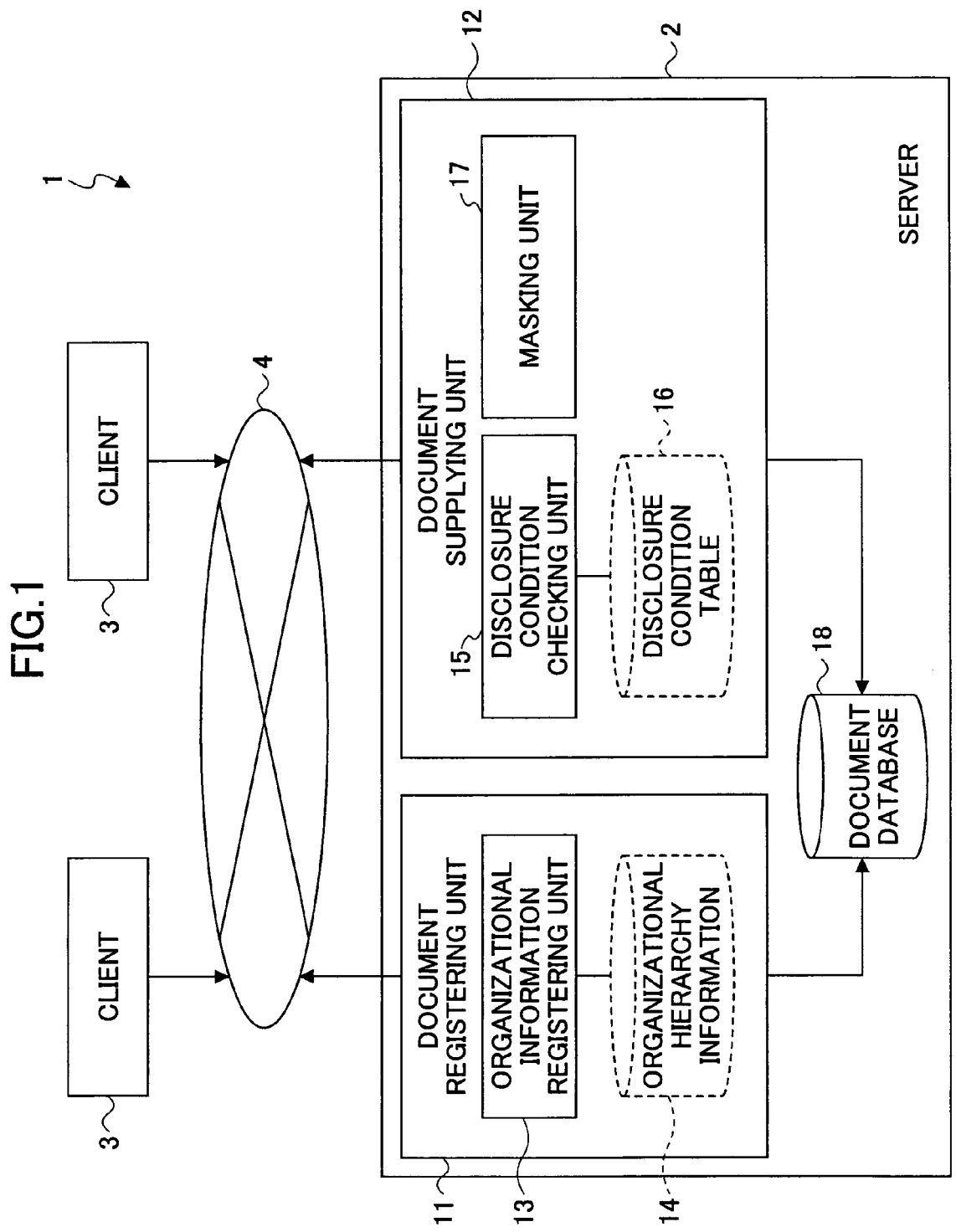
FIG. 1 is a functional block diagram showing a schematic configuration of a document supplying system according to an embodiment of the present invention.

FIG. 1 is a functional block diagram showing a schematic configuration of a document supplying system 1 according to an embodiment of the present invention. The document supplying system 1 includes a server 2 serving as a document supplying apparatus, clients 3, and a network 4 such as a LAN, through which the server 2 and the clients 3 are connected to each other.

In the document supplying system 1, a creator of a document (a person who registers the document, a person who manages the document) registers the document at one of the clients 3 with respect to the server 2 through the network 4. Then, a person who wishes to access the document registered in the server 2 accesses the document at one of the clients 3.

Figure 2:
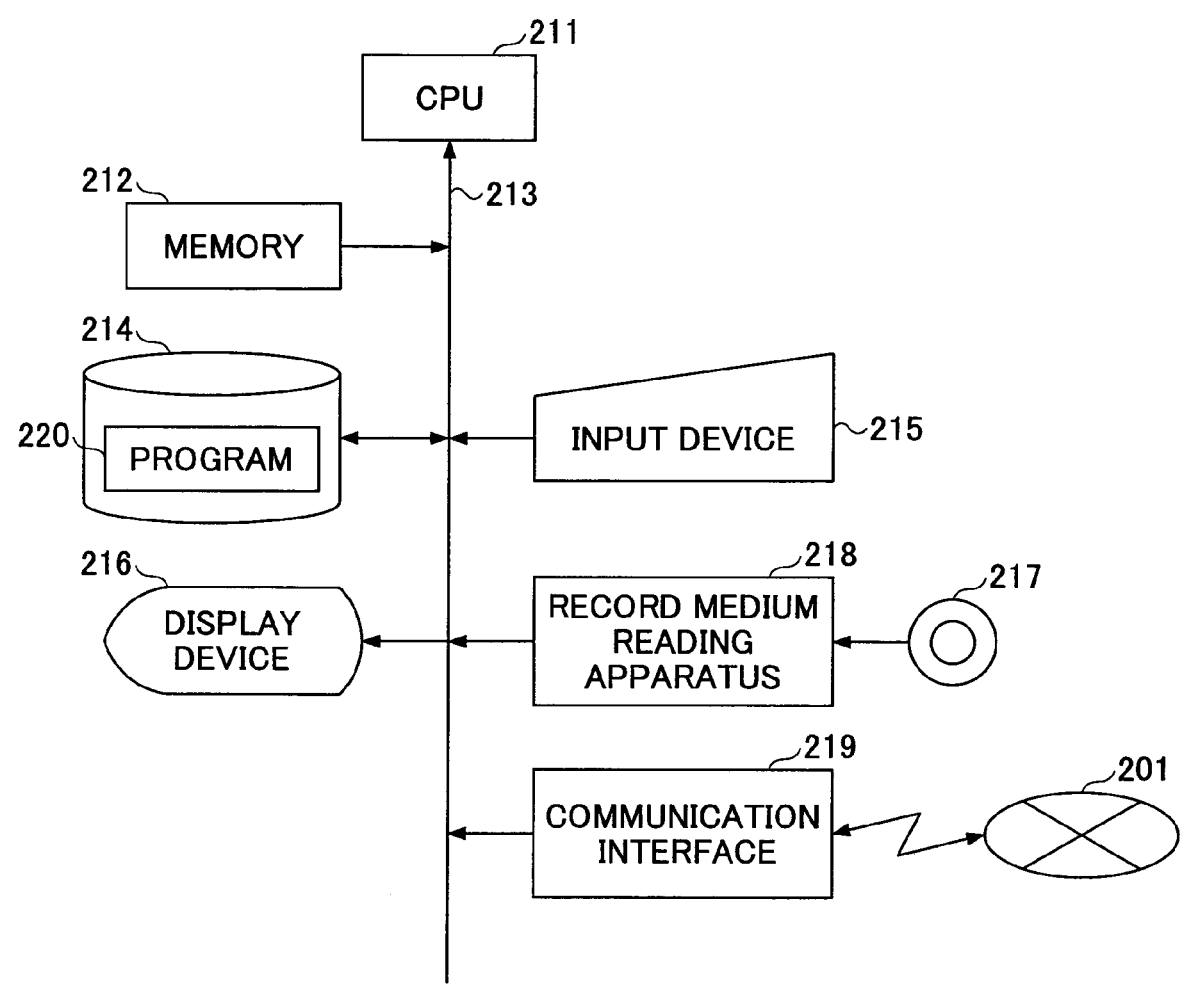
FIG. 2 is a block diagram showing electrical connections within a server or client.

FIG. 2 is a block diagram showing electrical connections within the server 2 or the client 3. As shown in FIG. 2, the server 2 or the client 3 includes a CPU 211 for performing various operations and centrally controlling each part of the apparatus, a memory 212 comprised of various ROMs and RAMs, and a bus 213, through which the CPU 211 and the memory 212 are connected to each other.

The bus 213 is connected to a magnetic recording device 214 such as a hard drive, an input device 215 such as a keyboard and mouse, and a display device 216 through respective interfaces. The bus 213 is also connected to a communication interface 219 for communicating with a network 201. As a record medium 217, various types of media such as an optical disk inclusive of a CD or DVD, a magnetooptical disk, or a flexible desk may be used. A record medium reading apparatus 218 may be an optical disc apparatus, a magnetooptical disk apparatus, or a flexible disk apparatus, depending on the type of the record medium 217.

The server 2 or client 3 reads a program 220 from the record medium 217 for installment in the magnetic recording device 214. The program 220 may alternatively be installed through downloading from the network 201 such as the Internet. After such installment, the server 2 or the client 3 is ready to perform processes as will be described later. The program 220 may be designed for execution on a predetermined OS.

As shown in FIG. 1, the server 2 includes a document registering unit 11 and a document supplying unit 12 implemented by processes performed by the installed program 220, and further includes a document database 18 stored in the magnetic recording device 214.

The document database 18 has a set of documents registered therein, which is comprised of a large number of documents turned into electronic data.

The document registering unit 11 resisters a document and relevant information necessary for registration paired up with the document when the creator of the document (or a person who registers the document, or a person who controls the document) registers the document in the document database 18. Such necessary information includes an identification of affiliation of the document creator as represented in a tree structure having as its nodes individual divisions of a particular organization such as the organization running the document supplying system 1. Namely, such information includes the name of the affiliated division, for example, and also includes its hierarchical position in the organizational tree structure.

The registration of a division name and a hierarchical position may be performed by acquiring the division name and hierarchical position from organizational hierarchy information 14 that represents the tree structure as described above, and by registering them as information paired up with the document. When the division name and hierarchical position are registered as information paired up with the document, the division name may be extracted from the organizational hierarchy information 14 as described here, or may be obtained without the use of the organizational hierarchy information 14. In addition to the division name, the name of the document creator, the document registering person, the document controlling person, etc., may be registered together with the document.

The document supplying unit 12 checks the affiliation of the client 3 (i.e., its division name and hierarchical position) in response to a request for access to a document coming from the client 3. This check is performed by identifying the client 3 that has requested access to a document, followed by looking up the identified client in a table in which affiliations are registered in advance with respect to the respective clients 3.

After this check, a disclosure condition checking unit 15 evaluates the relationship between the affiliation of the person who has requested the access and the registered affiliation that is paired up with the requested document.

A masking unit 17 then authorizes the disclosing of the requested document according to the level of the relationship between the affiliations evaluated by the disclosure condition checking unit 15, or permits or denies the disclosing of the document. Namely, the secrecy of the document may be removed in incremental steps according to the level of relationship between the affiliations, or the disclosing of the document may be permitted in one case and denied in another according to the level of relationship between the affiliations. These methods may be combined. A disclosure condition table 16 is used in determining how to treat the document in terms of the disclosing of the document according to the level of relationship between the affiliations.

Figure 3:
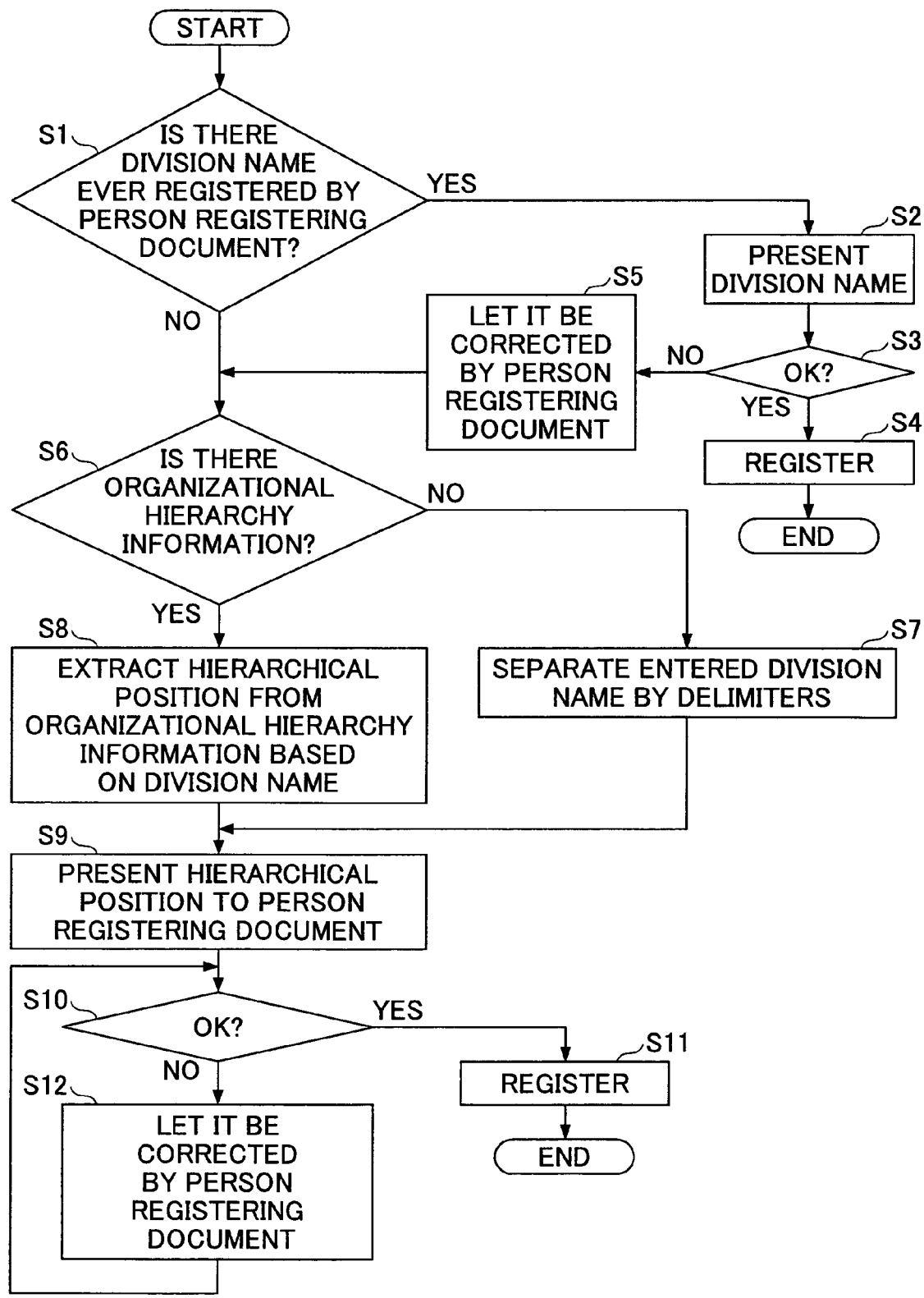
FIG. 3 is a flowchart showing a procedure performed by an organizational information registering unit provided in a document registering unit.

FIG. 3 is a flowchart showing a procedure performed by an organizational information registering unit 13 provided in the document registering unit 11. When a document is to be registered in the document database 18, affiliation of the document creator or the like also needs to be registered as information paired up with the document. To this end, a check is made as to whether the person registering the document has ever registered a division name (step S1). This check can be done by searching a registered division name paired up with any documents that are registered in the document database 18 and associated with the person registering the document. If there has been such registration (Y at step S1), the registered division name is presented to the person registering the document at the client 3 (step S2). As the person registering the document enters a predetermined input based on the determination that the presented division name is proper (Y at step S3), information about the division name is registered and paired up with the registered document (step S4).

If the person registering the document does not consent to the division name (or if there is no organizational information registered before) (N at step S3), the person registering the document is requested to modify the division name (or enter a division name) (step S5).

If there is no division name registered before by the person registering the document (N at step S1), a check is made as to whether the organizational hierarchy information 14 is registered (step S6). If there is no organizational hierarchy information 14 (or there is no corresponding organization) (N at step S6), hierarchical levels in the division name entered by the person registering the document are separated by spaces or delimiters (e.g., "/"), thereby extracting the hierarchical position (step S7). If the organizational hierarchy information 14 is registered (Y at step S6), the hierarchical position in the organization represented by the organizational hierarchy information 14 is extracted based on the division name entered by the person registering the document (step S8). Following either step S7 or step S8, the hierarchical position of the division to which the person registering the document belongs is presented to the person registering the document (step S9). If the person registering the document consents to the presented hierarchical position within the organization (Y at step S10), the hierarchical position within the organization is also registered and paired up with the registered document (step S11). If the person registering the document does not consent to the presented hierarchical position within the organization (N at step S10), the person registering the document is requested to modify the hierarchical position within the organization (step S12) The procedure then returns to step S10.

Figure 4:
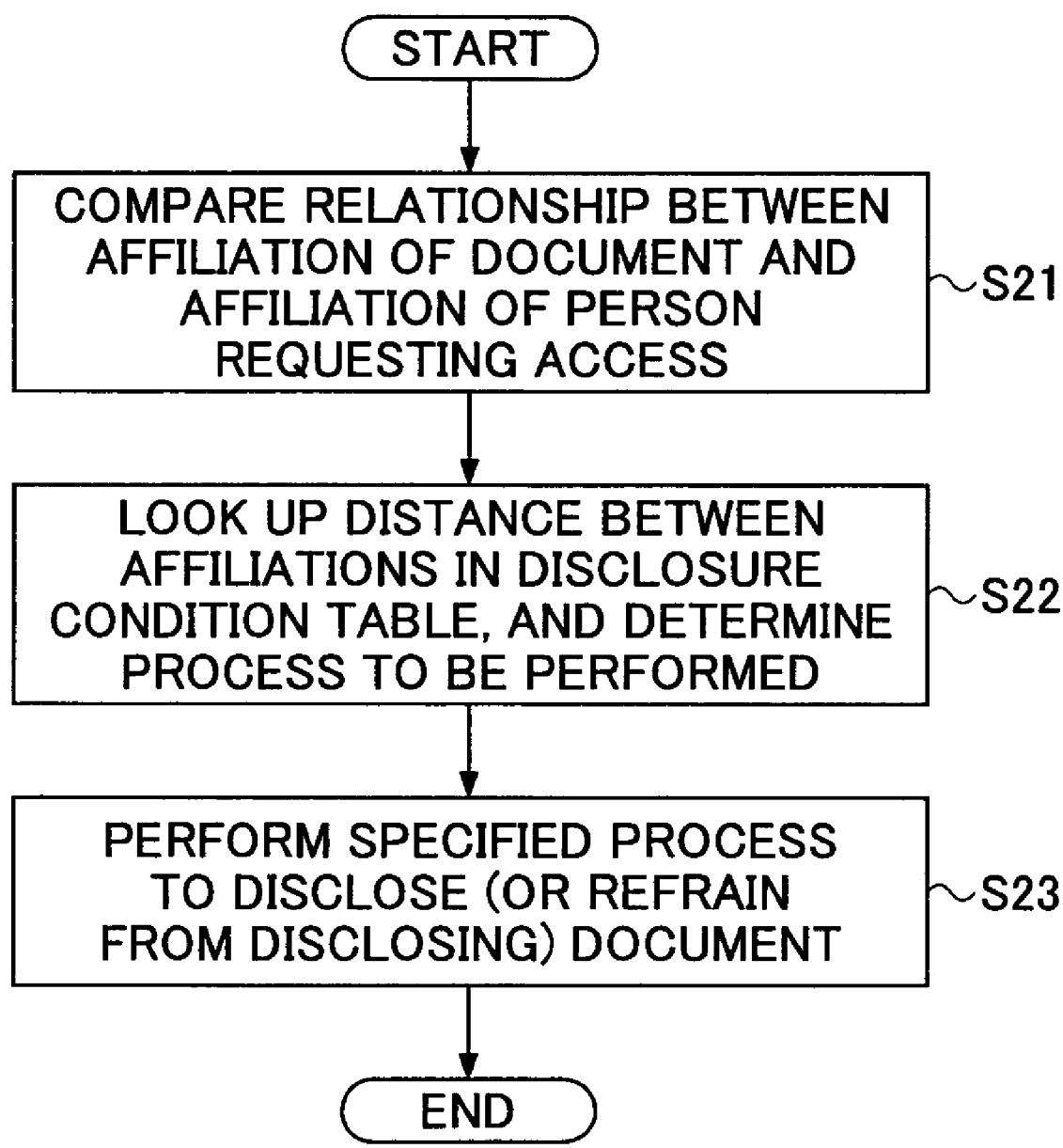
FIG. 4 is a flowchart showing a procedure performed by a disclosure condition checking unit.

FIG. 4 is a flowchart showing a procedure performed by the disclosure condition checking unit 15. When the relationship between the registered affiliation and the checked affiliation is evaluated with respect to the requested document in the tree structure having nodes representing the individual divisions of the organization, the relationship to be evaluated is a distance between the affiliations as represented by the number of steps or the length of paths between the nodes of the tree structure. The organizational hierarchy information 14 is referred to so as to compare the checked affiliation of the person requesting access with the registered affiliation of the requested document (step S21). The disclosure condition table 16 is then referred to so as to determine a process to be performed with respect to the disclosing of the document based on the distance between these affiliations (step S22). This determines the level of disclosure of the document. This process is then performed (step S23), thereby authorizing the disclosing of the requested document according to the ascertained level (or authorizes or denies the disclosing of the document).

When the relationship between the registered affiliation and the checked affiliation is evaluated with respect to the requested document in the tree structure having nodes representing the individual divisions of the organization, a check may be made to determine whether the affiliation registered with respect to the requested document is the same as the checked affiliation of the person requesting access. If these affiliations are the same, the entirety of the document may be disclosed. If these affiliations are not the same, information relating to privacy or confidential items may be masked, or the entirety of the document may be prohibited from being disclosed.

When the relationship between the registered affiliation and the checked affiliation is evaluated with respect to the requested document in the tree structure having nodes representing the individual divisions of the organization, a check may be made as to whether the checked affiliation of the person requesting access is subordinate to the affiliation registered with respect to the requested document. If the affiliation of the person requesting access is subordinate to the affiliation registered with respect to the requested document, the document is disclosed. Otherwise information relating to privacy and confidential items may be masked. In this case, the disclosure condition table 16 may not be used.

In addition, when the person registering the document registers the document, organizational affiliations to which the document can be disclosed may be specified in advance and registered as information paired up with the document. Depending on whether the affiliation of a person requesting access is found among these registered affiliations, the disclosing or restricting of the document may be controlled.

In the following, the process performed by the document supplying system 1 described above will further be described in detail.

Figures 5, 6:
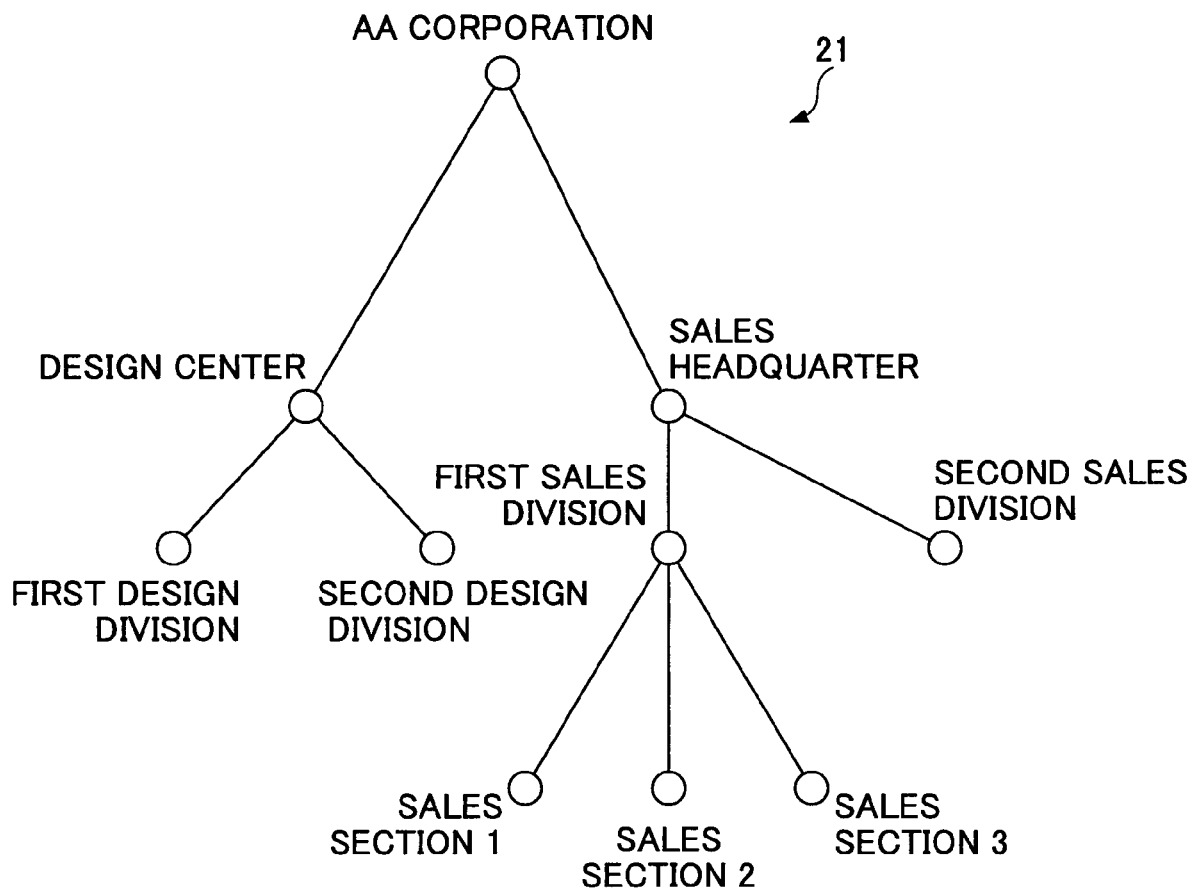
FIG. 5 is a drawing for explaining an example of the tree structure of an organization registered in organizational hierarchy information.
FIG. 6 is a drawing for explaining an example of a disclosure condition table.

FIG. 5 is a drawing for explaining an example of the tree structure of an organization registered in the organizational hierarchy information 14. A tree structure 21 has "AA Corporation" as a top node (each node is represented by an open circle). Being subordinate to this top node, "Sales Headquarter" and "Design Center" are provided. Being subordinate to "Sales Headquarter", "First Sales Division" and "Second Sales Division" are situated. Bing subordinate to "Design Center", "First Design Division" and "Second Design Division" are situated. Being Subordinate to "First Sales Division", "Sales Section 1", "Sales Section 2", and "Sales Section 3" are provided.

In the tree structure 21 shown in the example illustrated in FIG. 5, the distance between affiliations, i.e., the number of steps or the length of paths between nodes, can be obtained by counting the number of nodes from the start node to the end node. For example, the distance from "First Design Division" to "Sales Section 3" is "5", and the distance from "Sales Section 3" to "Second Sales Division" is "3".

In the organizational hierarchy information 14, taking the tree structure 21 of an organization shown in FIG. 5 as an example, affiliation of each division or section is identified by using the division name and the hierarchical position. Here, the division name is a name indicative of a node such as "Second Sales Division", "Design Center", or "Sales Section 1", and the hierarchical position is the information indicative of the position of the node in the tree structure 21. With respect to "Sales Section 1", for example, the hierarchical position is the information indicating a node situated at a fourth hierarchical level from the top node, subordinate to "Sales Headquarter" at the second hierarchical level, and subordinate to "First Sales Division" at the third hierarchical level (i.e., not subordinate to "Design Center" and "First Design Division", for example). All the information described here is registered in the organizational hierarchy information 14 separately for each division or section.

FIG. 6 is a drawing for explaining an example of the disclosure condition table 16. In the example shown in FIG. 6, the distance between an affiliation registered with respect to a requested document and the checked affiliation of a person requesting access in the tree structure having nodes representing the individual divisions of an organization is paired up with the process to be performed for the disclosing of the document with respect to the associated distance. In this example, if the affiliation of the person requesting access is the same as or subordinate to the affiliation registered for the requested document, the entirety of the document is disclosed. If these affiliations differ from each other only at the lowermost level in the tree structure of the organization, a masking process is applied to a predetermined portion of the document, and the document is disclosed. Otherwise, i.e., if the distance is large, the entirety of the document is kept from being disclosed.

In the process shown in FIG. 3, the person registering the document may be the chief of the "First Sales Division" in the example shown in FIG. 5. In this case, the affiliation is "Sales Headquarter First Sales Division". At step S7, the division names are separated by slashes as in "Sales Headquarter/First Sales Division", which is then registered at step S11.

In the following, a description will be given of an example of accessing a document. In the example described above, the person registering the document registered with respect to the requested document is "Sales Headquarter/First Sales Division".

Figure 7:
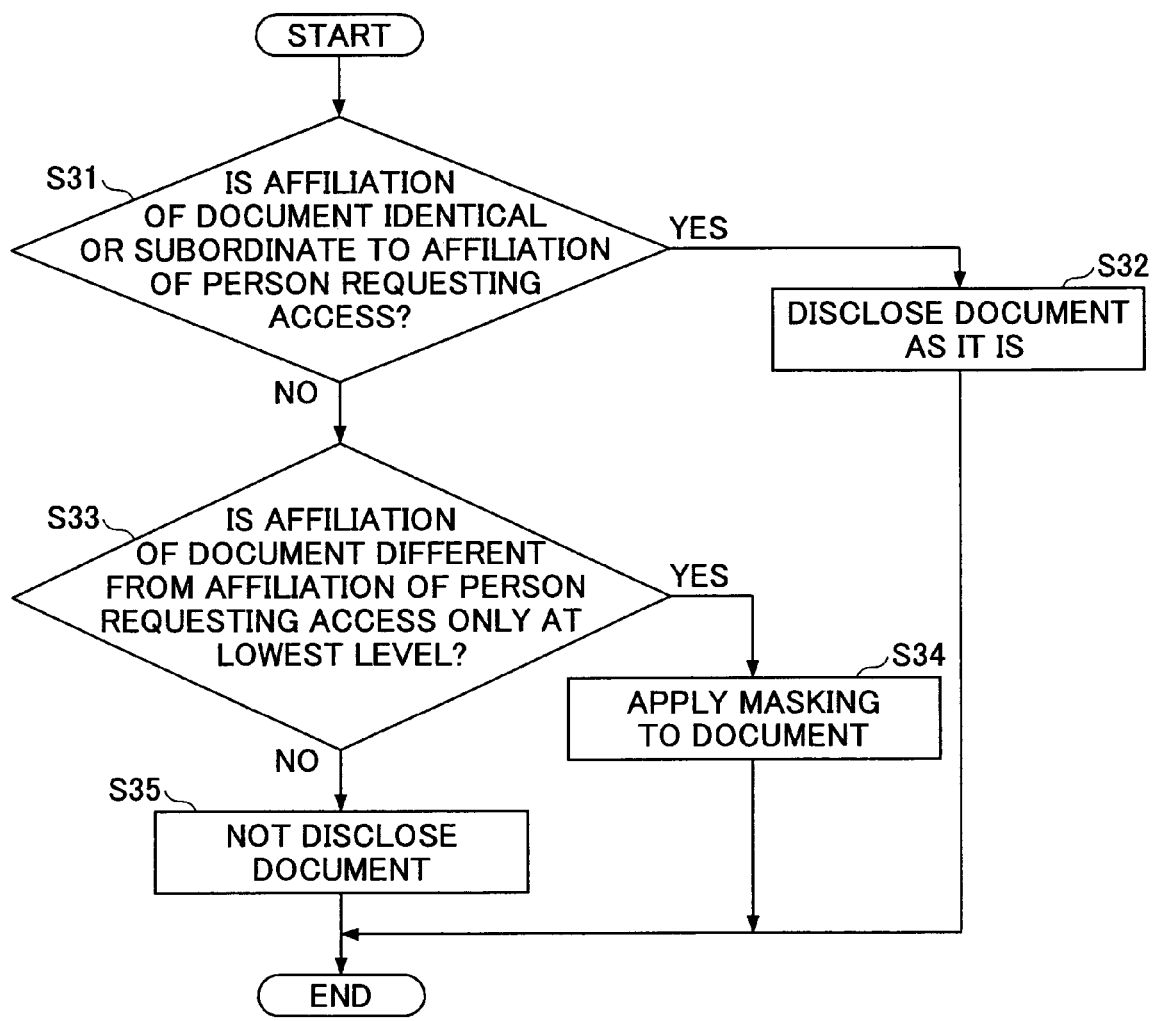
FIG. 7 is a flowchart of a process performed by a document supplying unit.

In the flowchart of FIG. 7, if the affiliations are the same, i.e., if the affiliation of the person requesting access is also "Sales Headquarter/First Sales Division" (Y at step S31), the document is disclosed to the person requesting access without any masking process (step S32).

If the affiliation of the person requesting access is subordinate to the affiliation registered with respect to the document (Y at step S31), e.g., if the affiliation of the person requesting access is "Sales Headquarter/First Sales Division/Sales Section 3", the document is disclosed to the person requesting access without any masking process (step S32).

The affiliation of the person requesting access may be different. That is, the affiliation of the person requesting access may be "Sales Headquarter/Second Sales Division". In this case, the portion "Sales Headquarter" is the same, but the subordinate level is different. Although this affiliation is not a subordinate level that affords a full disclosure, it differs only at the lowermost level (Y at step S33), so that the document is disclosed with a predetermined masking process applied thereto (step S34).

In other cases (N at step S33), the document is not disclosed (step S35).

In the following, masking applied to a document will be described. An example of a document registered in the document database 18 may be as follows.

Request for Decision

Please make a decision with respect to the following purchase.
Objective: Achieve Safe and Smooth Sharing of Information within the Division
Order to be Placed to: ABC Manufacturing
Price: 1,000,000 yen
Item to be Ordered: Document Supplying Apparatus When this document is masked for disclosing of the document, the document will appear as follows, for example.

Request for Decision

Please make a decision with respect to the following purchase.
Objective: Achieve Safe and Smooth Sharing of Information within the Division
Order to be Placed to: ABC Manufacturing
Price: XXXXXX yen
Item to be Ordered: Document Supplying Apparatus In this example, information about a monetary amount relating to a particular transaction is regarded not suitable for wide dissemination even within the same cooperate organization. The portion indicating the monetary amount is thus masked as shown by "XXXXXX"

Masking may be applied to the entirety of a relevant portion as illustrated above. Alternatively, part of a relevant portion may only be masked. If "ABC Manufacturing" is subjected to masking in the above example, a word at the end of the relevant portion may be left intact as in "XXX Manufacturing". A name may be changed to an initial, which is comprised of the first letter of the name (such an initial can be obtained based on the text data of the relevant letter portion. An expression may be modified to a generic expression by use of a thesaurus (e.g., modifying "ABC Manufacturing" to "Manufacturing Industry"). Such thesaurus may be provided in the server 2, or may be provided at a remote cite that is to be accessed through a network such as the Internet. An expression may be changed to a category name or a semantic classification name that indicates the meaning of the expression (e.g., modifying "ABC Manufacturing" to "Manufacturer").

If the affiliation of the person requesting access is "Design Center", for example, this affiliation is completely different from affiliations to which access to the document is permitted. In this case, thus, the entirety of the document is kept from being disclosed.

As in the manner described above, the affiliation of a person registering a document or the like that is given to the document by the person registering the document (or the creator or manager of the document) is checked with respect to the distance from the affiliation of the person requesting access in the tree structure 21, which is all that is necessary to control the permission/refusal of the disclosing of the document and the extent to which the document is disclosed. In order to perform this process, there is no need for a cumbersome process such as registering profile information in advance about all the members of an organization such as a company using the document supplying system 1. All that is necessary is to register information in advance about each division constituting the tree structure 21. Further, the proper control of information disclosure is achieved by using the relationship between a person registering a document and a person requesting access.

In the following, a description will be given of another embodiment.

Figure 8:
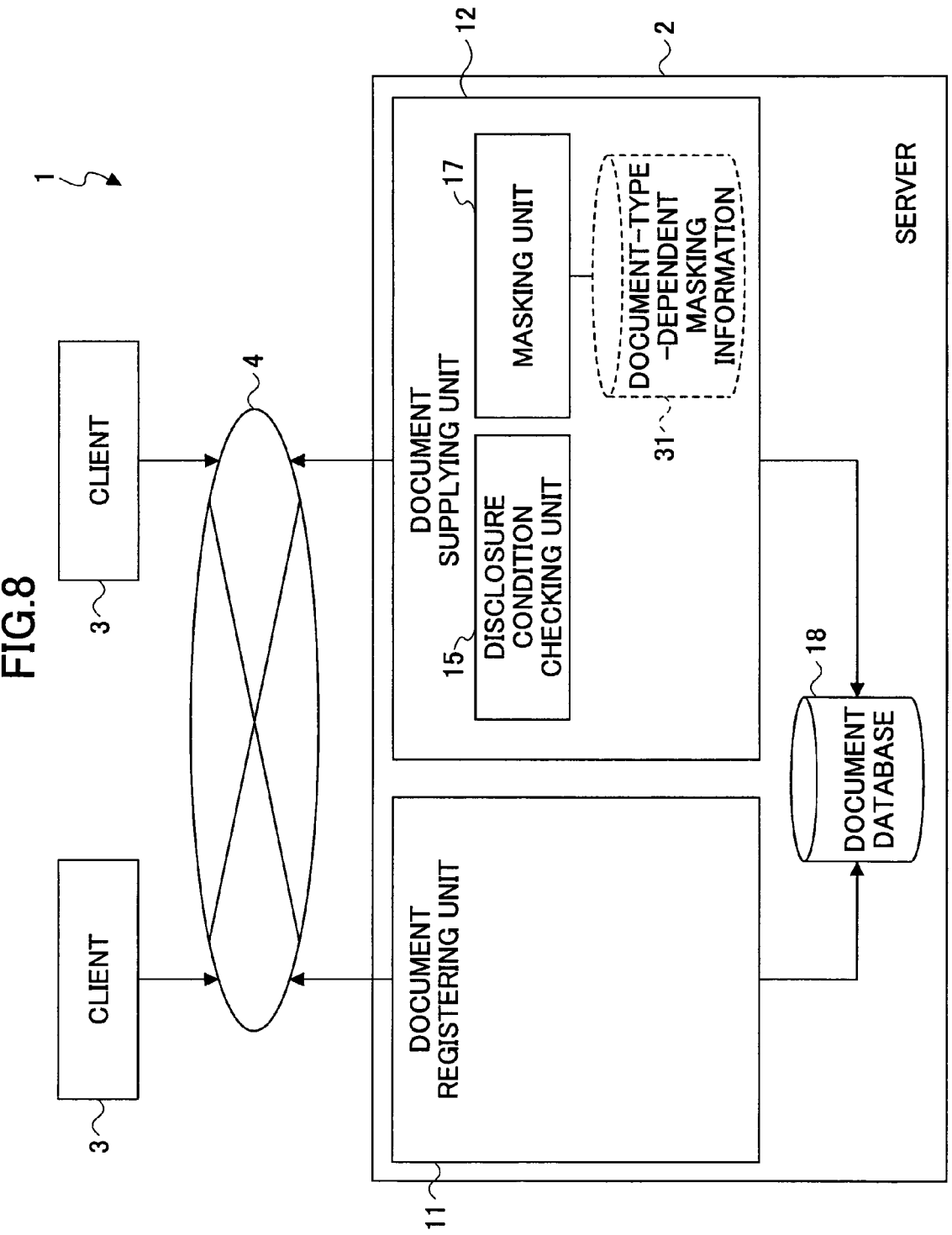
FIG. 8 is a functional block diagram of the document supplying system according another embodiment of the present invention.

FIG. 8 is a functional block diagram of the document supplying system 1 according another embodiment of the present invention. The blocks having the same reference numerals as those in FIG. 1 have the same functions as those in FIG. 1, and a detailed description thereof will be omitted. Further, electrical connections within the server 2 or the client 3 are the same as those shown in FIG. 2.

The document supplying system 1 of FIG. 8 differs from that of FIG. 1 in that document-type-dependent masking information 31 is provided. The document-type-dependent masking information 31 is a table that defines what information is masked separately for each document type registered in the document database 18. The document registering unit 11 registers a document type as information paired up with the registered document. This may be done by a user by manually selecting a document type for registration. Alternatively, the document registering unit 11 may mechanically determine a document type based on a character string such as a title of the document, and registers the document type upon a consent from the person registering the document.

FIG. 9 is a flowchart showing a procedure performed by the disclosure condition checking unit 15 and the masking unit 17. A document type is checked with respect to the requested document (step S41). Here, the type of the document may be ascertained based on a character string such as the title of the document, for example. Alternatively, the document type may be registered together with the document data by the person registering the document at the time of document registration. A check is then made based on the document-type-dependent masking information 31 as to whether the ascertained document type exists (step S42). If it exists (Y at step S43), masking is applied to such portion of the document as specified in the document-type-dependent masking information 31 (step S44). Alternatively, modification to another character string as previously described may be made. If the ascertained document type does not exist (N at step S43), the entirety of the document, as it is, is disclosed without any masking (step S45).

In this example, there is no need to identify the affiliation of the person registering the document and the affiliation of the person requesting access to the document. Because of this, the document registering unit 11 may not use the organizational hierarchy information 14, and may register document data without associating the data with the affiliation of the person registering the document. Further, the disclosure condition checking unit 15 may be operable to check whether to mask the document only based on the document-type-dependent masking information 31. Alternatively, the organizational hierarchy information 14 may additionally be used, so that a check as to whether to mask the document is made based on the distance between the affiliation of the person registering the document and the affiliation of the person requesting access to the document as well as the document-type-dependent masking information 31. For example, the document may be masked only when the distance between the affiliation of the person registering the document and the affiliation of the person requesting access to the document warrants a masking process, and, at the same time, the document type of the relevant document exists in the document-type-dependent masking information 31.

In the following, a detailed description of this embodiment will be given.

FIG. 10 is a drawing for explaining an example of the document-type-dependent masking information 31. In the example shown in FIG. 10, "Document Type" and "Masking Information" (i.e., a type, semantic, or category of information to be masked) are registered as paired-up items. Based on these registered items, a check is made as to whether masking is applied and as to which information is to be masked in the document if masking is applied. All document types to which masking is applied are described in the document-type-dependent masking information 31.

An example of a document which is requested for access may be as follows.

Request for Decision

Please make a decision with respect to the following purchase.
Objective: Achieve Safe and Smooth Sharing of Information within the Division
Order to be Placed to: ABC Manufacturing
Price: 1,000,000 yen
Item to be Ordered: Document Supplying Apparatus In this case, processing is performed as follows.

It is possible to determine that "document type" is a Request for Decision based on the title or the like of the document (step S41). The document-type-dependent masking information 31 is then referred to so as to check whether the "Request for Decision" is registered as a "Document Type" (step S42). If it is not registered (N at step S43), masking is not necessary (step S45). Since "Request for Decision" exists as a "Document Type" in this example, "Masking Information" is checked to find that "Monetary Amount" and "Company Name" are registered. "Monetary Amount" and "Company Name" are then identified in the character strings of the document to be masked (step S44). Here, it is ascertained that a character string such as "yen" indicates a "Monetary Amount", and a character string such as "Manufacturing" indicates a "Company Name".

When the company name and monetary amount are masked in the document of this example, the document will appear as follows.

Request for Decision

Please make a decision with respect to the following purchase.
Objective: Achieve Safe and Smooth Sharing of Information within the Division
Order to be Placed to: XXXXX
Price: XXXXXX
Item to be Ordered: Document Supplying Apparatus A further description will be given by taking the following document as an example.

IT NEWS

The Japan IT Association announced that projected PC sales exceeded the previous year's figure. A report prepared by the Association indicates that recovery of economy and the spread of broadband environment have largely contributed to the increase. Although investment in cooperate facilities remains roughly flat or is decreasing, an increase in the sales of PCs and peripherals for households appears to have contributed to the increase.

In this example, the person registering the document registers a "Document Type" as an item paired up with the document at the time of document registration. In this example, the document shown above is registered and paired up with the document type "Business Climate Outside Company". The document-type-dependent masking information 31 is referred to in order to check whether "Business Climate Outside Company" exists. Since there is no such entry in the document-type-dependent masking information 31, it is ascertained that masking of the document is unnecessary. The entirety of the document is thus disclosed as it is.

In the manner as described above, the document supplying system 1 is provided with the document-type-dependent masking information 31 that defines a level at which the disclosing of the document is permitted on a document-type-specific basis, or that defines the permission or refusal of the disclosing of the document. Specifically, the document-type-dependent masking information 31 in this example only includes document types to which masking is applied as previously described. The type of the document which is requested for access is identified, and the document-type-dependent masking information 31 is referred to in order to ascertain a level of permission at which the document is disclosed, or to ascertain the permission/refusal of the disclosing of the document (only the presence/absence of masking in this example). According to this determination, the document is disclosed or kept from being disclosed (the presence/absence of masking is controlled in this example).

According to the document supplying system 1 of this embodiment, the disclosing and sharing of information can be achieved without indiscriminately masking all documents as the registered documents may include documents made by simply collecting outside information, to which masking may be unnecessary depending on the types of documents. The present embodiment thus achieves proper control of document disclosure.

Further, type of information that should be masked is registered as masking information separately for each document type registered in the document-type-dependent masking information 31. This helps to achieve masking of selected information on a document-type-specific basis.

In the following, anther embodiment will be described.

FIG. 11 is a functional block diagram of the document supplying system 1 according to another embodiment of the present invention. The blocks having the same reference numerals as those in FIG. 8 have the same functions as those in FIG. 8, and a detailed description thereof will be omitted. Further, electrical connections within the server 2 or the client 3 are the same as those shown in FIG. 2.

The document supplying system 1 of FIG. 11 differs from that of FIG. 8 in that an organizational information registering unit 19 is provided in the document registering unit 11, and in that a masking expression correspondence table 41 is provided for the document database 18 in place of the document-type-dependent masking information 31.

The document registering unit 11 registers the affiliation of the person registering the document (or the creator or manager of the document) as information paired up with the document at the time of document registration in the document database 18 in the same manner as in the embodiment shown in FIG. 1.

As shown in the flowchart of FIG. 12, expressions relating to privacy or confidential items subjected to masking are extracted from the text of the document to be registered at the time of document registration (step S51). The extracted portions are replaced with the masking letters or other expressions when the document is registered in the document database 18 (step S52). Further, the expressions (original expressions) subjected to masking and their positions in the document are registered in the masking expression correspondence table 41 as information paired up with an identification (document ID) used for document registration (step S53). Here, the expressions relating to privacy or confidential items subjected to masking may be extracted by finding "yen" as an indicator of "Monetary Amount" and "XX Manufacturing" as an indicator of "Company Name". Namely, the occurrence of such a particular character string is taken as an indicator of an expression relating to privacy or confidential items. Such particular character strings may be assigned in advance to be used for extraction of these expressions.

When a request is made to access the document registered in the document database 18 in this manner, the disclosure condition checking unit 15 in the document supplying unit 12 checks the affiliation of the person requesting the access in the same manner as in the example shown in FIG. 1, and evaluates the relationship between the checked affiliation and the affiliation registered with respect to the document. The disclosure condition checking unit 15 then determines whether to disclose the document and whether to mask the document if the document is to be disclosed in the same manner as in the example shown in FIG. 1.

Figures 13, 14:
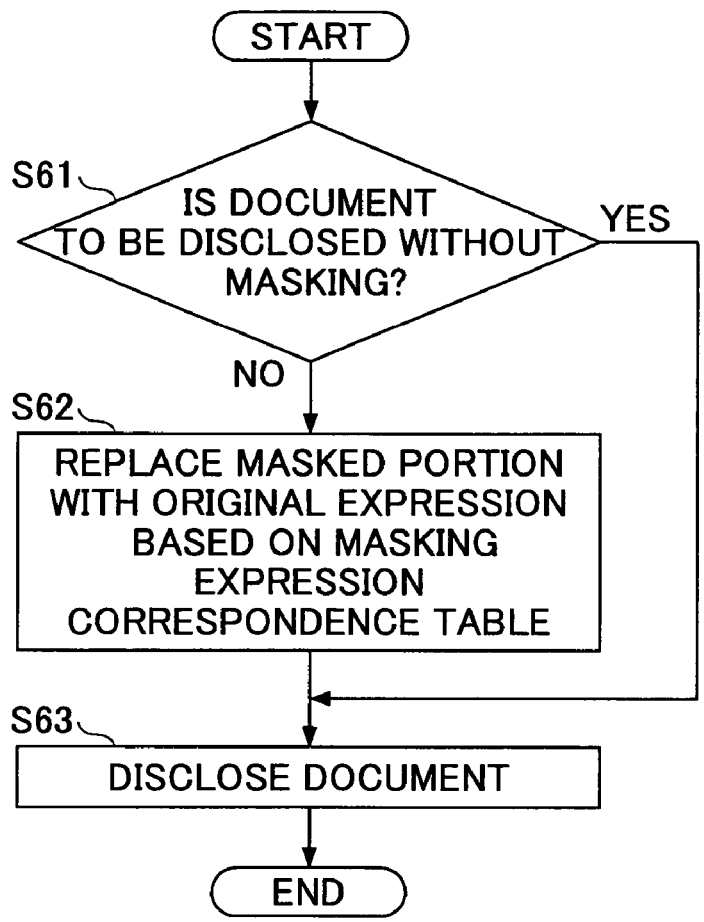
FIG. 13 is a flowchart of a process performed by a document supplying unit.
FIG. 14 is a drawing showing an example of a masking expression correspondence table.

As shown in the flowchart of FIG. 13, if the document is to be disclosed without masking (Y at step S61), the original expressions and their positions within the document paired up with the document ID of the document in the masking expression correspondence table 41 are referred to, thereby synthesizing the original expressions at the specified positions in the document (step S62). As a result, the document is returned to the masking-free, complete document as existed prior to the document registration, and this complete document is disclosed (step S63). That is, the original expressions are disclosed. If the document is to be disclosed with masking (N at step S61), the document as registered in the document database 18 with masking thereto is disclosed as it is, without using the masking expression correspondence table 41 (step S63).

In the following, a detailed description of this embodiment will be further described.

FIG. 14 is a drawing showing an example of the masking expression correspondence table 41. In this example, a document ID and a position within the document are stored as paired up items. It should be noted that the masking expression correspondence table 41 may be stored as encrypted information because of its highly confidential nature.

An example of a document which is to be registered may be as follows.

Request for Decision

Please make a decision with respect to the following purchase.
Objective: Achieve Safe and Smooth Sharing of Information within the Division
Order to be Placed to: ABC Manufacturing
Price: 1,000,000 yen
Item to be Ordered: Document Supplying Apparatus Together with the document, the affiliation of the person registering the document or the like is also registered as shown in the example illustrated in FIG. 1. In this example, "Sales Headquarter First Sales Division" is registered as an affiliation, for example. Here, if a slash is uses as a delimiter between hierarchical levels, it should appear as "Sales Headquarter/First Sales Division".

In this example, information regarding a corporate name and a monetary amount is to be masked. Such masking is performed at the time of document registration, thereby producing the following document.

Request for Decision

Please make a decision with respect to the following purchase.
Objective: Achieve Safe and Smooth Sharing of Information within the Division
Order to be Placed to: XXX Manufacturing
Price: XXXXXX yen
Item to be Ordered: Document Supplying Apparatus This document is stored in the document database 18.

In conjunction with this, the expressions prior to the masking are stored in the masking expression correspondence table 41 as follows.

| Document ID | Position in Document | Original |
| --- | --- | --- |
| 1 | 119 | ABC Manufacturing |
| 1 | 129 | 1,000,000 yen |

In this example, the position in the document is represented by the number of bytes from the start of the document.

When a request for accessing the document is made, the disclosure condition checking unit 15 compares the checked affiliation of the person requesting access with the affiliation registered with respect to the document. If the affiliation of the person requesting access is "Sales Headquarter/First Sales Division/Sales Section 3", for example, this affiliation is subordinate to "Sales Headquarter/First Sales Division" for which access to the document is permitted. In the previous example that was described in connection with FIG. 1 onwards, the entirety of the document can be disclosed in such a case. It follows that the masking expression correspondence table 41 is used to bring the registered document back to its original expressions that existed prior to the registration, and the obtained document is presented to the person requesting access. If the masking expression correspondence table 41 is encrypted, for example, decryption is performed upon the determination by the disclosure condition checking unit 15. If the affiliation of the person requesting access is "Sales Headquarter/Second Sales Division", this affiliation differs only in a division name at the last hierarchical level. In this case, recovery of the pre-registration original document by use of the masking expression correspondence table 41 is not made, and the masked document is disclosed as it is.

In the manner as described above, documents registered in the document database 18 are masked prior to the registration in this embodiment. Compared with the embodiment shown in FIG. 1 onwards, thus, tighter control of information disclosure is achieved with respect to highly confidential businesses and documents.

Further, the present invention is not limited to these embodiments, but various variations and modifications may be made without departing from the scope of the present invention.

The present application is based on Japanese priority application No. 2004-072665 filed on Mar. 15, 2004, with the Japanese Patent Office, the entire contents of which are hereby incorporated by reference.

What is claimed is:
1. An apparatus for supplying a document, comprising:
a machine readable storage medium configured to store therein a set of documents and a position within an organization of a person who registers one of the documents paired up with one of the documents;
a unit configured to store the documents in the machine readable storage medium after removing one or more predetermined expressions from the documents;

a second storage unit configured to store therein the one or more expressions and locations thereof in the documents separately for each of the documents;

a unit configured to receive a request for accessing said one of the documents;

a unit configured to check a position within said organization of a person who made the request;

a unit configured to evaluate a positional relationship in a tree structure between the checked position within said organization and the stored position within said organization paired up with said one of the documents, wherein the tree structure represents a hierarchical structure of the organization with nodes of the tree structure representing affiliations within the organization;

a disclosure condition storing unit configured to store information defining a process to be performed with respect to a given relationship by pairing up the process with a relationship in the tree structure between the position checked by the unit configured to check a position and the stored position;

a unit configured to ascertain a level of disclosure with respect to said one of the documents in response to the evaluated relationship; and a unit configured to control disclosing of said one of the documents according to the ascertained level of disclosure, wherein when said one of the documents is disclosed in an entirety thereof according to the ascertained level of disclosure, said one of the documents is returned to an original thereof by synthesizing said one of the documents with the one or more expressions extracted from a second storage unit at the locations extracted from said second storage unit.

2. The apparatus as claimed in claim 1, wherein the relationship is a total number of steps or a total length of paths between the nodes in the tree structure.

3. The apparatus as claimed in claim 1, wherein the relationship indicates presence or absence of equality between the checked position and the stored position paired up with said one of the documents.

4. The apparatus as claimed in claim 1, wherein the relationship indicates whether one position is subordinate to another position among the checked position and the stored position paired up with said one of the documents.

5. The apparatus as claimed in claim 1, wherein said one of the documents is disclosed in an entirety thereof, is disclosed with partial masking thereof, or is not disclosed at all according to the ascertained level of disclosure.

6. The apparatus as claimed in claim 1, further comprising a unit configured to identify the position within the organization and store in said machine readable storage medium the identified position as paired up with said one of the documents at a time of storing said one of the documents.

7. The apparatus as claimed in claim 1, wherein when said one of the documents is partially disclosed according to the ascertained level of disclosure, said one of the documents is disclosed with partial masking thereof or with replacement of one or more portions thereof by one or more letters.

8. The apparatus as claimed in claim 7, wherein when said one of the documents is disclosed with replacement of one or more portions thereof by one or more letters, said portions are replaced with initials, generic expressions, or category names.

9. A machine-readable storage medium having a program embodied thereon for causing a computer to supply a document, said program comprising:

a program-code unit configured to store, in a storage unit, a set of documents and a position within an organization of a person who registers one of the documents paired up with one of the documents;

a program-code unit configured to store the documents in a second storage unit after removing one or more predetermined expressions from the documents;

a program-code unit configured to store in a second storage unit the one or more expressions and locations thereof in the documents separately for each of the documents;

a program-code unit configured to receive a request for accessing said one of the documents;

a program-code unit configured to check a position of a person who made the request;

a program-code unit configured to evaluate a positional relationship in a tree structure between the checked position and the stored position paired up with said one of the documents, wherein the tree structure represents a hierarchical structure of the organization with nodes of the tree structure representing positions within the organization;

a program-code unit configured to store information defining a process to be performed with respect to a given relationship by pairing up the process with a relationship in the tree structure between the position checked by the program-code unit configured to check a position and the stored position;

a program-code unit configured to ascertain a level of disclosure with respect to said one of the documents in response to the evaluated relationship;

a program-code unit configured to control disclosing of said one of the documents according to the ascertained level of disclosure; and a program-code unit configured so that, when said one of the documents is disclosed in an entirety thereof according to the ascertained level of disclosure, said one of the documents is returned to an original thereof by synthesizing said one of the documents with the one or more expressions extracted from the second storage unit at the locations extracted from the second storage unit.

10. The machine-readable medium as claimed in claim 9, wherein the relationship is a total number of steps or a total length of paths between the nodes in the tree structure.

11. The machine-readable medium as claimed in claim 9, wherein the relationship indicates presence or absence of equality between the checked position and the stored affiliation paired up with said one of the documents.

12. The machine-readable medium as claimed in claim 9, wherein the relationship indicates whether one position is subordinate to another position among the checked position and the stored position paired up with said one of the documents.

13. An apparatus for supplying a document through a computer network, comprising:

a machine readable storage medium configured to store therein a set of documents and a position within an organization of a person who registers on of the documents paired up with one of the documents;

a unit configured to store the documents in the machine readable storage medium after removing one or more predetermined expressions from the documents;

a second storage unit configured to store therein the one or more expressions and locations thereof in the documents separately for each of the documents;

a unit configured to receive a request for accessing one of the documents through the computer network;

a check unit configured to check a position of a person who made the request;

an evaluation unit configured to refer to a memory unit that stores information about affiliation in the organization as a tree structure representing a hierarchical structure of the organization with nodes of the tree structure representing positions within the organization so as to evaluate a positional relationship in the tree structure between the position checked by the check unit and the affiliation that is stored in the machine readable storage and paired up with said one of the documents requested for access;

a disclosure condition storing unit configured to store information defining a process to be performed with respect to a given relationship by pairing up the process with a relationship in the tree structure between the position checked by the check unit and the position that is stored in the machine readable storage and paired up with said one of the documents requested for access;

a checking unit configured to ascertain a level of disclosure with respect to said one of the documents requested for access by referring to the disclosure condition storing unit according to the relationship evaluated by the evaluation unit; and a unit configured to control disclosing of said one of the documents according to the ascertained level of disclosure, wherein when said one of the documents is disclosed in an entirety thereof according to the ascertained level of disclosure, said one of the documents is returned to an original thereof by synthesizing said one of the documents with the one or more expressions extracted from a second storage unit at the locations extracted from the second storage unit.

* * * * *